United States Patent [19]
Osumi et al.

[11] 4,222,770
[45] Sep. 16, 1980

[54] ALLOY FOR OCCLUSION OF HYDROGEN

[75] Inventors: Yasuaki Osumi, Minou; Hiroshi Suzuki, Ikeda; Akihiko Kato, Matsubara; Masanori Nakane, Takatsuki; Yoshizo Miyake, Toyonaka, all of Japan

[73] Assignees: Agency of Industrial Science & Technology, Ministry of International Trade & Industry; Ministry of International Trade & Industry, both of Tokyo, Japan

[21] Appl. No.: 18,941

[22] Filed: Mar. 9, 1979

[30] Foreign Application Priority Data

Mar. 31, 1978 [JP] Japan .................................. 53-38662
May 31, 1978 [JP] Japan .................................. 53-66118

[51] Int. Cl.$^2$ ............................................ C22C 19/03
[52] U.S. Cl. ............................................. 75/122; 34/15; 75/134 B; 75/134 C; 75/134 F; 75/152; 75/170; 75/171; 423/644
[58] Field of Search ............. 75/170, 171, 122, 134 B, 75/134 C, 134 F, 152; 34/15; 423/644

[56] References Cited

U.S. PATENT DOCUMENTS

4,096,639 6/1978 Sandrock .............................. 75/170

FOREIGN PATENT DOCUMENTS

51-126919 11/1976 Japan .

OTHER PUBLICATIONS

Nippon Kagaku Kaishi, pp. 1267–1272, 1975.
Reilly et al., Inorganic Chemistry, vol. 13, pp. 218–222, 1974.
Van Vucht et al., Philips Research Reports, 25, pp. 133–140, 1970.
Reilly et al., Inorganic Chemistry, vol. 7, pp. 2254–2256, 1968.

*Primary Examiner*—R. Dean
*Attorney, Agent, or Firm*—Kurt Kelman

[57] ABSTRACT

An alloy of the general formula, $MmNi_{5-x}A_x$ (wherein, Mm stands for misch metal, A for one member selected from the group consisting of B, Ca, Cr, Cu, Fe, V, Zn and Si, and x for a numerical value in the range of from 0.01 to 2), which is useful for the occlusion of hydrogen.

5 Claims, No Drawings

ALLOY FOR OCCLUSION OF HYDROGEN

BACKGROUND OF THE INVENTION

This invention relates to an alloy for the occlusion of hydrogen, and more particularly to a novel, useful multi-element alloy for the occlusion of hydrogen, which alloy is capable of occluding a large amount of hydrogen in the form of a hydride and also capable of readily and rapidly releasing hydrogen upon application thereto of slight heat.

Recently, hydrogen has come to attain increasing prominence as a promising, new form of energy to take the place of fossil fuels. This is because it is clean, is available in literally inexhaustible supplies, is amenable to transportation and storage and does not disturb the cycle of nature. Hydrogen has heretofore been stored in the form of gaseous hydrogen, liquefied hydrogen or a metallic hydride. The method for storing hydrogen in the form of a metallic hydride is arresting particular attention because it permits safe storage of a given amount of hydrogen in the same space as is required for the storage of hydrogen in the form of liquefied hydrogen. The substance used for the storage of hydrogen in the form of a metallic hydride must satisfy the requirements (1) that the substance should be inexpensive and enjoy abundance of supply, (2) that it should easily be activated and possess a high capacity for occlusion of hydrogen, (3) that it should possess a proper dissociation equilibrium pressure in the neighborhood of room temperature and (4) that it should permit occlusion and release of hydrogen reversibly and at a high velocity. Such transient metals as Ti, Zr, La and Mg which have heretofore been recognized to be capable of forming hydrides are such that their hydrides are unusually stable thermally and do not release hydrogen until their temperatures are elevated beyond the level of 300° C. Therefore, these metals are not feasible for the storage of hydrogen. As materials for hydrogen storage, there have been developed various alloys including Ti-Ni alloy (Nippon Kagaku Kaishi, 1267–1272, 1975), Ti-Co alloy (Nippon Kagaku Kaishi, 1267–1272, 1975), Ti-Fe alloy (J. J. Reilly, R. H. Wiswall, Jr.: Inorganic Chemistry, 13, 218, 1974), La-Ni alloy (J. H. N. VanVucht, F. A. Kuijpers, H. C. A. M. Burning: Philips Research Reports, 25, 133: 1970—U.S. Pat. No. 3,825,418) and Mg-Ni alloy (J. J. Reilly, R. H. Wiswall, Jr.: Inorganic Chemistry, 7, 2254: 1968). However, these alloys are less than perfect as materials for the occlusion of hydrogen.

Of the alloys mentioned above, those containing Ti, La and Mg possess thermal stability similar to the aforementioned metals Ti, La and Mg, require much time for the occlusion and release of hydrogen and do not permit ready activation. The metals as components for the alloys are required to possess extremely high purity, thus posing a problem from the economic point of view. Further, since the alloy's capacities for the occlusion of hydrogen are affected by the purity of hydrogen, the hydrogen itself must be of very high purity. As described above, the materials heretofore suggested for the storage of hydrogen suffer from various disadvantages. No metals or alloys have yet been perfected which satisfy all the requirements indispensable for the purpose of hydrogen occlusion.

The inventors continued a study in search of an alloy capable of satisfying all these requirements. We developed an alloy comprising misch metal (Mm) and nickel or cobalt and possessing a high capacity for occlusion of hydrogen in the form of hydride and filed a patent application covering the alloy composition and the method for its use (Japanese Patent Application No. 52927/1975). The alloy has an advantage that it is inexpensive, permits occlusion and release of hydrogen at a low temperature and occludes hydrogen to a density substantially equal to the density involved in the storage of hydrogen in the form of liquefied hydrogen. Comparison of the misch metal-nickel ($MmNi_5$) alloy with the misch metal-cobalt ($MmCo_5$) alloy in terms of the maximum capacity for the occlusion of hydrogen in the form of hydride (1.5% by weight for $MmNi_5$ and 0.7% by weight for $MmCo_5$) and the dissociation equilibrium pressure (14 atmospheres for $MmNi_5$ and 0.8 atmospheres for $MmCo_5$) reveals that the $MmNi_5$ hydride possesses a high capacity for hydrogen occlusion and a high dissociation equilibrium pressure at room temperature, whereas the $MmCo_5$ hydride possesses a low capacity for hydrogen occlusion and a low dissociation equilibrium pressure. Thus, the two alloys are opposite to each other in their properties. As an improvement to this invention, the inventors developed an alloy of the general formula, $MmNi_{5-x}Co_x$, as disclosed in U.S. Pat. No. 4,147,536 dated Apr. 3, 1979. This alloy of a molecular formula, $MmNi_{2.5}CO_{2.5}$, for example, possesses 1.18% by weight of capacity for hydrogen occlusion and 3.3 atmospheres of dissociation equilibrium pressure at 20° C., indicating that it is equal to $MmNi_5$ in the capacity for hydrogen occlusion and close to $MmCo_5$ in the dissociation equilibrium pressure. These alloys nevertheless suffer from a disadvantage that their velocities of hydrogen occlusion are low and their other properties have room for further improvement.

A primary object of this invention is to provide a misch metal-based alloy of a new composition for the occlusion of hydrogen, which is inexpensive and capable of readily occluding a large amount of hydrogen at a high velocity to a high density and releasing hydrogen under mild conditions and possesses a proper dissociation equilibrium pressure, thus meeting practical requirements for use in stationary hydrogen-storage facilities.

SUMMARY OF THE INVENTION

To accomplish the object described above according to the present invention, there is provided a misch metal-based multi-element alloy of the general formula, $MmNi_{5-x}A_x$ (wherein, Mm stands for misch metal, A for one member selected from the group consisting of B, Ca, Cr, Cu, Fe, V, Zn and Si, and x for a numerical value in the range of from 0.01 to 2), which is capable of occluding hydrogen and usable for the storage of hydrogen.

The misch metal-based multi-element alloy of the present invention described above is a novel alloy developed for the first time by the inventors and it satisfies the aforementioned requirements which are indispensable to successful occlusion of hydrogen. This alloy is characterized by the fact that it is inexpensive and capable of being readily activated, allowing a large amount of hydrogen to be occluded at a high velocity to a high density and readily and rapidly releasing occluded hydrogen upon exposure to room temperature or to the heating to a moderate temperature slightly higher than room temperature. The velocity at which this alloy occludes hydrogen is several times that obtainable by any of the conventional alloys. Further, the capacity of the alloy of this invention for occlusion of hydrogen is not affected in any way by the purity of the hydrogen being occluded. Thus, hydrogen adulterated by small amounts of oxygen, nitrogen, argon, carbon dioxide, etc. can efficiently be occluded by this alloy. In addition to the various merits mentioned above, the alloy of the present invention has a unique advantage that it can retain its initial capacity for hydrogen occlusion intact after repeated cycles of hydrogen occlusion and release operations.

DETAILED DESCRIPTION OF THE INVENTION

Generally the misch metal which is used in the alloy of the present invention comprises 25 to 30% by weight of La, 40 to 45% by weight of Ce, 10 to 15% by weight of Pr, 4 to 5% by weight of Nd, and 4 to 7% by weight of Sm+Gd as essential elements and accompanying elements which are entrained by such essential elements. The accompanying elements include 0.1 to 5% by weight of Fe, 0.1 to 1% by weight of Si, 0.1 to 2% by weight of Mg and 0.1 to 1% by weight of Al. Usually these accompanying elements are all present in a mixed form or at least one of such elements is present in the misch metal. The metal is marketed by Santoku Metal Industry, Shin-Nippon Metal Industry, Shin'etsu Chemical Industry, etc. in Japan.

The alloy of the present invention is represented by the general formula, $MmNi_{5-x}A_x$ (wherein, x stands for a numerical value in the range of from 0.01 to 2). The alloy having a composition of this general formula is characterized by outstanding advantages (1) that it possesses a high capacity for occlusion of hydrogen, (2) that it occludes hydrogen to a high density in the neighborhood of room temperature and releases the occluded hydrogen at a temperature slightly higher than the room temperature, (3) that it possesses a suitable dissociation equilibrium pressure in the neighborhood of room temperature, (4) that the heat of formation of hydride is small, (5) that it is readily activated with hydrogen, (6) that it occludes and releases hydrogen at a high velocity and retains the initial capacity for hydrogen occlusion intact after repeated cycles of occlusion and release operations, (7) that its capacity for hydrogen occlusion is not affected at all by the purity of hydrogen being occluded, (8) that it has a high density thus making possible to store more hydrogen per unit of storage space and (9) that it is not expensive. The combination of these outstanding properties renders the alloy ideal for use in stationary hydrogen-storage facilities.

These properties are particularly conspicuous when the symbol "A" in the formula represents B, Ca, Cr, Cu, Fe, V or Zn and the symbol "x" a value in the range of from 0.1 to 1 or when the symbol "A" represents Si and the symbol "x" a value in the range of from 0.1 to 1.5. In the case a composition having Si as "A," the properties are manifested best when the symbol "x" represents a value in the range of from 0.5 to 0.75.

The reason for the limited range of the numerical value of "x" is that the occlusion and release of hydrogen by this alloy proceed at a very low velocity when the value of "x" is less than 0.01, whereas the alloy's capacity for hydrogen occlusion is notably degraded when the value of "x" exceeds 2. In the case of a composition having B, Ca, Cr, Cu, Fe, V or Zn is used as "A," the alloy is readily activated and occludes and releases hydrogen at a high velocity when the value of "x" falls in the range of from 0.1 to 1. When the alloy has a composition which contains Cr, Fe or Zn as "A," it occludes and releases hydrogen at the highest velocity and, what is more, the dissociation equilibrium pressure at room temperature has a desirable value. In the case of an alloy composition which has Si as "A," the alloy is readily activated and occludes and releases hydrogen at a high velocity where the value of "x" falls in the range of from 0.1 to 1.5. In this alloy composition, the alloy occludes and releases hydrogen at the highest velocity and shows an advantageous dissociation equilibrium pressure at room temperature when the value of "x" ranges from 0.5 to 0.75 in particular.

Now, the method by which the alloy of this invention for hydrogen occlusion is produced will be described. Among the various methods available for this purpose, the method of arc fusion can be used particularly advantageously. To be specific, the alloy can easily be obtained by mixing misch metal, nickel and the component A, each in a powdered form or in a suitably molded form (usually in the shape of rods), in respective amounts calculated to give the composition specified by the invention, compressing molding the resultant mixture into a desired shape, mounting the molded pieces in position in a known arcfusion furnace, fusing the molded pieces under the atmosphere of an inert gas and allowing the fused mixture to cool off.

The efficiency with which the alloy of this invention produces its effect improves in proportion as the surface area of the alloy increases. Generally, therefore, the alloy is used in the form of particles 100 to 200 mesh in particle size.

The alloy can be activated very easily and, after the activation, it can easily and rapidly occlude and release a large amount of hydrogen. The activation of the alloy is effected by subjecting the alloy to just one cycle of hydrogen occlusion and release or, in the case of a special composition having Si as "A," to two cycles of the operation. The occlusion of hydrogen by the alloy, namely the formation of the alloy hydride is carried out by filling a suitable container with the alloy in a pulverized form, forcing hydrogen into the packed mass of the alloy particles at room temperature, sealing the system and applying to the system a pressure with hydrogen to at least about 50 kg/cm$^2$. Particularly, the alloy of the present invention has an advantage that the occlusion of hydrogen can be carried out in a very short period of less than a few minutes at room temperature. In the case of an alloy composition having Si as "A," the occlusion is completed in a matter of one minute at 20° C. In contrast, the aforementioned Ti-Fe, Ti-Ni, Ti-Co, La-Ni and Mg-Ni alloys undergo substantially no hydrogen occlusion under application of hydrogen pressure of 50 kg/cm$^2$ at room temperature. Thus, they cannot be activated by hydrogen occlusion under such conditions.

Under the hydrogen pressure of 50 kg/cm$^2$, the operation of occlusion is required to be carried out at high temperatures of about 400° to 500° C. and the activation of the alloy requires the occlusion operation to be repeated several times. Even in the case of the MmNi$_5$ alloy, the activation to be effected under the conditions of room temperature and 50 kg/cm$^2$ of hydrogen pressure requires the aforementioned occlusion operation to be repeated several times.

After the completion of the aforementioned occlusion operation, the release of the occluded hydrogen from the alloy is readily caused by evacuating the system. Consequently, the activation of the alloy is brought to completion.

The storage of hydrogen in the alloy which has been activated as described above is accomplished by filling a tightly sealable container such as, for example, an ordinary gas cylinder with the activated alloy and applying to the packed mass of the alloy particles a stated hydrogen pressure (which is slightly higher than the dissociation pressure of the hydride of the alloy in use) at temperatures ranging from $-30°$ C. to room temperature. Consequently, the alloy has a large amount of hydrogen occluded therein in the form of $MmNi_{4.5}B_{0.5}H_{6.1}$, $MmNi_{4.5}Ca_{0.5}H_{6.4}$, $MmNi_{4.5}Cr_{0.5}H_{6.9}$, $MmNi_{4.0}Cu_{1.0}H_{6.6}$, $MmNi_{4.0}Fe_{1.0}H_{6.5}$, $MmNi_{4.5}V_{0.5}H_{6.4}$, $MmNi_{4.5}Zn_{0.5}H_{6.6}$ or $MmNi_{4.5}Si_{0.5}H_{6.4}$ in a short span of time. The release of hydrogen from such a hydride can be accomplished simply by opening the aforementioned container at room temperature. The release of hydrogen from the alloy can be efficiently carried out in a short period of time by heating the alloy to a temperature higher than normal room temperature or lowering the pressure applied to the alloy of effecting the elevation of temperature and the decrease of pressure at the same time. The occlusion and release of hydrogen in the activated alloy of this invention can be carried out very easily as compared with the same operations performed in the conventional Ti-Fe, Ti-Ni, La-Ni, Mm-Ni and other alloys. The alloy of this invention has an advantage that such operations can be efficiently performed efficiently on the alloy at a velocity more than three times as high as on the conventional alloys. Further, in the alloy of this invention, the occlusion and release of hydrogen are completely reversible. No matter how often the formation of the hydride and the decomposition thereof are repeated cyclically, substantially no degradation is recognized in the alloy in itself. This means that the alloy of this invention can be used for a long time. Impurities such as oxygen, nitrogen, argon and carbon dioxide which are present in the hydrogen being occluded are recognized to have practically no effect upon the alloy.

The alloy involved in the present invention has a high density. For this reason, the volume of the container for the alloy can be reduced. One commercially available compression cylinder capable of storing 7000 liters of hydrogen has an inner volume of about 50 liters. If the same volume of hydrogen is to be stored by use of the alloy of $MmNi_{4.5}Si_{0.5}$, the volume of this alloy is about 5 liters, indicating that the inner volume of the cylinder can be reduced to about one-tenth. The alloy possesses properties which render it highly suitable for use in stationary hydrogen-storage facilities.

Working examples of the present invention will be cited hereinafter for further specific illustration of this invention.

EXAMPLE 1

Mm, Ni and a varying component A, each prepared in the form of rods (5 mm in diameter and 5 mm in length) or a powder were mixed in amounts calculated to satisfy the formula, $MmNi_{5-x}A_x$ (wherein, Mm stands for misch metal, A for one member selected from the group consisting of B, Ca, Cr, Cu, Fe, V, Zn and Si, and x for a numerical value in the range of from 0.01 to 2). The resultant mixture was compression molded into cylindrical tablets. The tablets were placed in a copper crucible inside a high-vacuum arc-fusion furnace. After the air inside the furnace interior had been displaced with high-purity argon, the tablets were fused at a temperature about 2000° C. and then allowed to cool off to produce an alloy of composition shown in Table 1. The alloy was crushed to particles 120 mesh in particle size. A 5.0 g portion of the crushed alloy was placed in a stainless steel reactor adapted for occlusion and release of hydrogen. The alloy was subjected to activation as described below: The reactor was connected to an exhaust device and then heated at 200° C. under a vacuum to effect degasification of the alloy. Subsequently, hydrogen 99.9999% in purity was introduced into the reactor until the hydrogen pressure in the reactor interior reached 50 kg/cm$^2$. When this hydrogen pressure was retained, the occlusion of hydrogen by the alloy was recognized to ensue immediately. After the occlusion of hydrogen had terminated, the reactor interior was again evacuated to bring the release of hydrogen from the alloy to completion. The alloy was activated by subjecting the alloy to one or two cycles of the aforementioned occlusion and release operations. The activated alloy was caused to occlude therein hydrogen 99.9999% in purity at a hydrogen pressure slightly higher than the dissociation pressure of the hydride of that particular alloy at temperatures ranging from $-30°$ C. to normal room temperature (30° C.) and, thereafter, the system was sealed to keep the hydrogen in storage. The hydrogen occlusion properties determined in the experiment are shown in Table 1. For the purpose of comparison, a known alloy, $MmNi_5$, prepared by following the aforementioned procedure was similarly tested for hydrogen occlusion properties, the results of which are shown in Run No. 1 in Table 1.

TABLE 1

| Run No. | Alloy composition | Hydride composition | Dissociation equilibrium pressure (atm) | Hydrogen content (wt %) | Number of cycles of activation | Heat of formation of hydride (Kcal/molH$_2$) | Velocity of hydrogen occlusion (ml/g.min.) | Energy of activation (Kcal/mol) | Velocity of hydrogen release from hydride °C. | ml/g.min. |
|---|---|---|---|---|---|---|---|---|---|---|
| 1 | $MmNi_5$ | $MmNi_{5.0}H_{6.6}$ | 14.0(30° C.) | 1.5 | 6 | 6.4 | 40 | 30 | 20 | 81 |
| 2 | $MmNi_{4.99}B_{0.01}$ | $MmNi_{4.99}B_{0.01}H_{6.6}$ | 14.0(30° C.) | 1.5 | 2 | 6.4 | 160 | | 20 | 103 |
| 3 | $MmNi_{4.5}B_{0.5}$ | $MmNi_{4.5}B_{0.5}H_{6.1}$ | 20.0(30° C.) | 1.5 | 1 | 6.4 | 163 | 20 | 20 | 138 |
| 4 | $MmNi_{4.99}Ca_{0.01}$ | $MmNi_{4.99}Ca_{0.01}H_{6.6}$ | 14.0(30° C.) | 1.5 | 2 | 6.4 | 155 | | 20 | 110 |
| 5 | $MmNi_{4.5}Ca_{0.5}$ | $MmNi_{4.5}Ca_{0.5}H_{6.4}$ | 15.0(30° C.) | 1.5 | 1 | 6.0 | 158 | 20 | 20 | 140 |
| 6 | $MmNi_{4.99}Cr_{0.01}$ | $MmNi_{4.99}Cr_{0.01}H_{6.9}$ | 12.0(30° C.) | 1.6 | 2 | 6.4 | 160 | | 20 | 120 |
| 7 | $MmNi_{4.5}Cr_{0.5}$ | $MmNi_{4.5}Cr_{0.5}H_{6.9}$ | 5.0(30° C.) | 1.6 | 1 | 7.2 | 165 | 19 | 20 | 165 |
| 8 | $MmNi_{4.0}Cr_{1.0}$ | $MmNi_{4.0}Cr_{1.0}H_{6.4}$ | 4.6(30° C.) | 1.5 | 1 | 6.9 | 165 | | 20 | 150 |
| 9 | $MmNi_{4.99}Cu_{0.01}$ | $MmNi_{4.99}Cu_{0.01}H_{6.6}$ | 13.0(30° C.) | 1.5 | 2 | 6.4 | 154 | | 20 | 105 |
| 10 | $MmNi_{4.0}Cu_{1.0}$ | $MmNi_{4.0}Cu_{1.0}H_{6.6}$ | 11.0(30° C.) | 1.5 | 1 | 6.5 | 160 | 19 | 20 | 143 |
| 11 | $MmNi_{3.0}Cu_{2.0}$ | $MmNi_{3.0}Cu_{2.0}H_{5.8}$ | 7.8(30° C.) | 1.3 | 2 | 7.3 | 130 | | 20 | 130 |

TABLE 1-continued

| Run No. | Alloy composition | Hydride composition | Dissociation equilibrium pressure (atm) | Hydrogen content (wt %) | Number of cycles of activation | Heat of formation of hydride (Kcal/molH$_2$) | Velocity of hydrogen occlusion (ml/g.min.) | Energy of activation (Kcal/mol) | Velocity of hydrogen release from hydride | |
|---|---|---|---|---|---|---|---|---|---|---|
| | | | | | | | | | °C. | ml/g.min. |
| 12 | MmNi$_{4.99}$Fe$_{0.01}$ | MmNi$_{4.99}$Fe$_{0.01}$H$_{6.6}$ | 10.0(30° C.) | 1.5 | 2 | 6.8 | 160 | | 20 | 108 |
| 13 | MmNi$_{4.0}$Fe$_{1.0}$ | MmNi$_{4.0}$Fe$_{1.0}$H$_{6.5}$ | 6.0(30° C.) | 1.5 | 1 | 7.4 | 165 | 18 | 20 | 162 |
| 14 | MmNi$_{3.0}$Fe$_{2.0}$ | MmNi$_{3.0}$Fe$_{2.0}$H$_{5.6}$ | 1.9(30° C.) | 1.3 | 2 | 9.2 | 150 | | 20 | 135 |
| 15 | MmNi$_{4.99}$V$_{0.01}$ | MmNi$_{4.99}$V$_{0.01}$H$_{6.6}$ | 13.0(30° C.) | 1.5 | 2 | 6.4 | 160 | | 20 | 100 |
| 16 | MmNi$_{4.5}$V$_{0.5}$ | MmNi$_{4.5}$V$_{0.5}$H$_{6.4}$ | 11.0(30° C.) | 1.5 | 1 | 5.9 | 165 | 19 | 20 | 140 |
| 17 | MmNi$_{4.99}$Zn$_{0.01}$ | MmNi$_{4.99}$Zn$_{0.01}$H$_{6.6}$ | 10.0(30° C.) | 1.5 | 2 | 6.5 | 163 | | 20 | 105 |
| 18 | MmNi$_{4.5}$Zn$_{0.5}$ | MmNi$_{4.5}$Zn$_{0.5}$H$_{6.6}$ | 4.6(30° C.) | 1.5 | 1 | 7.4 | 165 | 17 | 20 | 160 |
| 19 | MmNi$_{4.0}$Zn$_{1.0}$ | MmNi$_{4.0}$Zn$_{1.0}$H$_{5.7}$ | 8.4(30° C.) | 1.3 | 1 | 6.1 | 160 | | 20 | 130 |
| 20 | MmNi$_{4.99}$Si$_{0.01}$ | MmNi$_{4.99}$Si$_{0.01}$H$_{6.6}$ | 12.0(30° C.) | 1.5 | 2 | 6.4 | 140 | | 20 | 100 |
| 21 | MmNi$_{4.9}$Si$_{0.1}$ | MmNi$_{4.9}$Si$_{0.1}$H$_{6.6}$ | 11.0(30° C.) | 1.5 | 1 | 6.4 | 155 | | 20 | 135 |
| 22 | MmNi$_{4.5}$Si$_{0.5}$ | MmNi$_{4.5}$Si$_{0.5}$H$_{6.4}$ | 7.0(30° C.) | 1.5 | 1 | 7.3 | 185 | 22 | 20 | 155 |
| 23 | MmNi$_{4.25}$Si$_{0.75}$ | MmNi$_{4.25}$Si$_{0.75}$H$_{6.3}$ | 4.8(30° C.) | 1.5 | 1 | 7.1 | 185 | | 20 | 160 |
| 24 | MmNi$_{3.5}$Si$_{1.5}$ | Mmni$_{3.5}$Si$_{1.5}$H$_{5.9}$ | 4.5(150° C.) | 1.5 | 1 | 12.8 | 160 | | 20 | 130 |

It is learnt from Table 1 that any of the alloys of this invention occludes in a volume substantially equal to or greater than the volume occluded by MmNi$_5$ (Run No. 1) and requires a small energy for activation and that the number of cycles of activation is only ⅓ to 1/6 and the velocity of hydrogen occlusion is three to four times that obtainable with MmNi$_5$. The release of hydrogen from the hydride of the alloy of this invention could be easily carried out by heating the reactor to room temperature or to a temperature slightly higher than room temperature, by decreasing the interior pressure of the reactor or by effecting the elevation of temperature and decrease of pressure at the same. The velocity of the release of hydrogen was very high, similarly to that of the occlusion of hydrogen.

EXAMPLE 2

Alloys identical to those prepared in Example 1 were activated by using hydrogen about 99.5% in purity. The activation of each alloy was completed by subjecting the alloy to one or two cycles of hydrogen occlusion and release. The alloy was caused to occlude hydrogen 99.5% in purity at room temperature (30° C.) under a hydrogen pressure slightly higher than the dissociation pressure of the hydride of that alloy and the container was sealed to keep the occluded hydrogen in storage. The hydrogen occlusion properties of the alloys (Test Run Nos. 2–24) such as the amounts of hydrogen occluded, the dissociation pressures of the hydrides, the energies of activation and the velocities of hydrogen occlusion were substantially the same as those obtained in Example 1. The hydrides thus produced released hydrogen readily and rapidly at velocities similar to those involved in Example 1. Some of the results are shown in Table 2.

EXAMPLE 3

Alloys identical to those prepared in Example 1 were activated by using hydrogen 99.5% in purity. The activated alloys were subjected to about 100 cycles of hydrogen occlusion and release operations. The hydrides which were obtained at the end of the experiment were found to have compositions as shown in Table 3, which are identical to those shown in Table 1. The results indicate that the alloys of this invention are not affected by the purity of hydrogen and that the initial properties of the alloys are not degraded by repetition of hydrogen occlusion and release operations.

TABLE 3

| Hydride composition after the first hydrogenation | Hydride composition after the 50th hydrogenation | Hydride composition after the 100th hydrogenation |
|---|---|---|
| MmNi$_{4.5}$Cr$_{0.5}$H$_{6.9}$ | MmNi$_{4.5}$Cr$_{0.5}$H$_{6.9}$ | MmNi$_{4.5}$Cr$_{0.5}$H$_{6.9}$ |
| MmNi$_{4.0}$Fe$_{1.0}$H$_{6.5}$ | MmNi$_{4.0}$Fe$_{1.0}$H$_{6.5}$ | MmNi$_{4.0}$Fe$_{1.0}$H$_{6.5}$ |
| MmNi$_{4.5}$Zn$_{0.5}$H$_{6.6}$ | MmNi$_{4.5}$Zn$_{0.5}$H$_{6.6}$ | MnNi$_{4.5}$Zn$_{0.5}$H$_{6.6}$ |
| MmNi$_{4.5}$Si$_{0.5}$H$_{6.4}$ | MmNi$_{4.5}$Si$_{0.5}$H$_{6.4}$ | MmNi$_{4.5}$Si$_{0.5}$H$_{6.4}$ |

What is claimed is:

1. An alloy for the occlusion of hydrogen and having the generic formula MmNi$_{5-x}$A$_x$, wherein Mm is a mischmetal comprising 25 to 30% by weight of La, 40 to 45% by weight of Ce, 10 to 15% by weight of Pr, 4 to 5% by weight of Nd, and 4 to 7% by weight of Sm+Gd as essential elements and accompanying elements entrained by said essential elements, A is a member selected from the group consisting of B, Ca, Cr, Cu, Fe, V, Zn and Si, and x is a numerical value in the range of 0.01 to 2.

TABLE 2

| Run No. | Alloy composition | Hydride Composition | Dissociation equilibrium pressure (atm) | Hydrogen content (wt%) | Number of cycles of activation | Heat of formation of hydride (Kcal/molH$_2$) | Velocity of hydrogen occlusion (ml/g.min.) | Energy of activation (Kcal/mol) | Velocity of hydrogen release from hydride | |
|---|---|---|---|---|---|---|---|---|---|---|
| | | | | | | | | | °C. | ml/g.min. |
| 1 | MmNi$_{4.5}$Cr$_{0.5}$ | MmNi$_{4.5}$Cr$_{0.5}$H$_{6.9}$ | 5.0(30° C.) | 1.6 | 1 | 7.2 | 165 | 19 | 20 | 160 |
| 2 | MmNi$_{4.0}$Fe$_{1.0}$ | MmNi$_{4.0}$Fe$_{1.0}$H$_{6.5}$ | 6.0(30° C.) | 1.5 | 1 | 7.4 | 165 | 18 | 20 | 162 |
| 3 | MmNi$_{4.5}$Zn$_{0.5}$ | MmNi$_{4.5}$Zn$_{0.5}$H$_{6.6}$ | 4.6(30°C.) | 1.5 | 1 | 7.4 | 165 | 17 | 20 | 160 |
| 4 | MmNi$_{4.5}$Si$_{0.5}$ | MmNi$_{4.5}$Si$_{0.5}$H$_{6.4}$ | 7.0(30° C.) | 1.5 | 1 | 7.3 | 165 | 22 | 20 | 155 |

2. The alloy according to claim 1, wherein the accompanying elements are at least one member selected from the group consisting of 0.1 to 5% by weight of Fe, 0.1 to 1% by weight of Si, 0.1 to 2% by weight of Mg and 0.1 to 1% by weight of Al.

3. The alloy according to claim 1, wherein A represents one member selected from the group consisting of B, Ca, Cr, Cu, Fe, V and Zn and x represents a numerical value in the range of from 0.1 to 1.

4. The alloy according to claim 2, wherein A represents one member selected from the group consisting of Cr, Fe and Zn and x represents a numerical value in the range of from 0.1 to 1.

5. The alloy according to claim 1, wherein A represents Si and x represents a numerical value in the range of from 0.1 to 1.5.

* * * * *